(12) United States Patent
Cooper

(10) Patent No.: US 8,024,639 B2
(45) Date of Patent: Sep. 20, 2011

(54) SOFTWARE AND METHODS TO DETECT AND CORRECT DATA STRUCTURE

(75) Inventor: Francis J. Cooper, Downingtown, PA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 1181 days.

(21) Appl. No.: 11/691,975

(22) Filed: Mar. 27, 2007

(65) Prior Publication Data

US 2007/0300121 A1  Dec. 27, 2007

Related U.S. Application Data

(60) Provisional application No. 60/816,206, filed on Jun. 23, 2006.

(51) Int. Cl.
*H03M 13/00* (2006.01)
(52) U.S. Cl. .......................... 714/758; 714/763
(58) Field of Classification Search .................. 714/758, 714/763
See application file for complete search history.

(56) References Cited

U.S. PATENT DOCUMENTS

| | | |
|---|---|---|
| 3,946,281 A | 3/1976 | Llona et al. |
| 4,296,475 A | 10/1981 | Nederlof et al. |
| 4,493,081 A | 1/1985 | Schmidt |
| 4,506,362 A | 3/1985 | Morley |
| 4,521,872 A | 6/1985 | Sawada et al. |
| 4,530,431 A | 7/1985 | Spurlin |
| 4,534,031 A | 8/1985 | Jewer |
| 4,769,735 A | 9/1988 | Ueda |
| 5,276,690 A | 1/1994 | Lee et al. |
| 5,533,195 A | 7/1996 | LaRochelle et al. |
| 5,555,250 A | 9/1996 | Walker et al. |
| 5,610,929 A * | 3/1997 | Yamamoto .................. 714/785 |
| 5,627,716 A | 5/1997 | Lagree et al. |
| 5,844,918 A | 12/1998 | Kato |

(Continued)

FOREIGN PATENT DOCUMENTS

JP 59-176939 10/1984

(Continued)

OTHER PUBLICATIONS

Australian Examiner's first report on patent application No. 2007202363 dated Oct. 24, 2008, Patent Examination B; C4-Electronics, Australian Government, IP Australia.

(Continued)

*Primary Examiner* — Esaw Abraham
(74) *Attorney, Agent, or Firm* — Eugene M. Cummings, P.C.

(57) ABSTRACT

Methods to detect and correct bit errors in data include the steps of specifying to a compiler a storage area with a variable wherein the variable includes a data value corresponding to its data size and an error checking code, calculating an error checking code value indicative of the corresponding data structure value, storing the variable with the error checking code value, retrieving the variable upon demand, detecting an error on the data value using the error checking code value, and correcting the error upon detection of an error on the data value. Further steps may include storing and retrieving the data structure directly onto the storage area without additional encoding and decoding circuitry, encoding and decoding the data structure without altering the data structure format during storing and retrieving from the storage area, or detecting and correcting double bit errors. Software for the methods is provided on or in a computer readable medium.

25 Claims, 7 Drawing Sheets

U.S. PATENT DOCUMENTS

| | | | |
|---|---|---|---|
| 5,856,903 A | 1/1999 | Smith | |
| 5,872,722 A | 2/1999 | Oravetz et al. | |
| 5,917,841 A | 6/1999 | Kodama et al. | |
| 5,974,529 A | 10/1999 | Zumkehr | |
| 5,987,393 A | 11/1999 | Stinson | |
| 6,055,145 A | 4/2000 | Lagree et al. | |
| 6,138,253 A | 10/2000 | Buzsaki | |
| 6,195,767 B1 | 2/2001 | Adams | |
| 6,292,911 B1 | 9/2001 | Swanson | |
| 6,397,355 B1 | 5/2002 | Curtis et al. | |
| 6,453,440 B1 | 9/2002 | Cypher | |
| 6,457,146 B1 | 9/2002 | Keen et al. | |
| 6,473,880 B1 | 10/2002 | Cypher | |
| 6,477,682 B2 | 11/2002 | Cypher | |
| 6,594,774 B1 | 7/2003 | Chapman et al. | |
| 6,615,376 B1 | 9/2003 | Olin et al. | |
| 6,839,868 B1 | 1/2005 | Pignol | |
| 6,874,107 B2 | 3/2005 | Lesea | |
| 6,886,116 B1 | 4/2005 | MacLellan et al. | |
| 6,961,890 B2 * | 11/2005 | Smith | 714/763 |
| 6,973,613 B2 | 12/2005 | Cypher | |
| 6,983,414 B1 | 1/2006 | Duschatko et al. | |
| 7,266,755 B2 * | 9/2007 | Lamy | 714/777 |
| 7,331,043 B2 * | 2/2008 | Saulsbury | 717/143 |
| 7,350,131 B2 * | 3/2008 | Trainin | 714/758 |
| 7,526,187 B2 * | 4/2009 | Takagi et al. | 386/329 |
| 7,747,929 B2 * | 6/2010 | Kyung et al. | 714/779 |
| 7,810,017 B2 * | 10/2010 | Radke | 714/769 |
| 7,814,397 B2 * | 10/2010 | Lin | 714/779 |
| 2003/0097628 A1 | 5/2003 | Ngo et al. | |
| 2004/0153215 A1 | 8/2004 | Kearney | |
| 2004/0153902 A1 | 8/2004 | Machado et al. | |
| 2005/0289407 A1 | 12/2005 | Noda et al. | |
| 2005/0289442 A1 | 12/2005 | Derner et al. | |
| 2006/0114627 A1 | 6/2006 | Wong | |

FOREIGN PATENT DOCUMENTS

| | | |
|---|---|---|
| JP | 59-196698 | 11/1984 |
| JP | 02-044921 | 2/1990 |
| WO | WO 03/032159 A3 | 4/2003 |

OTHER PUBLICATIONS

I.L. Van Der Merwe, et al., "Implementation of an Unconventional Voltage Slide Scheme" pp. 1-25, Apr. 2005.

Wikipedia, "Hamming Code," pp. 1-8, Jun. 12, 2006.

Nahmsuk Oh, et al., "Error Detection by Duplicated Instructions in Super-scalar Processors," Center for Reliable Computing, Technical Report, Apr. 2000, pp. 1-31.

* cited by examiner

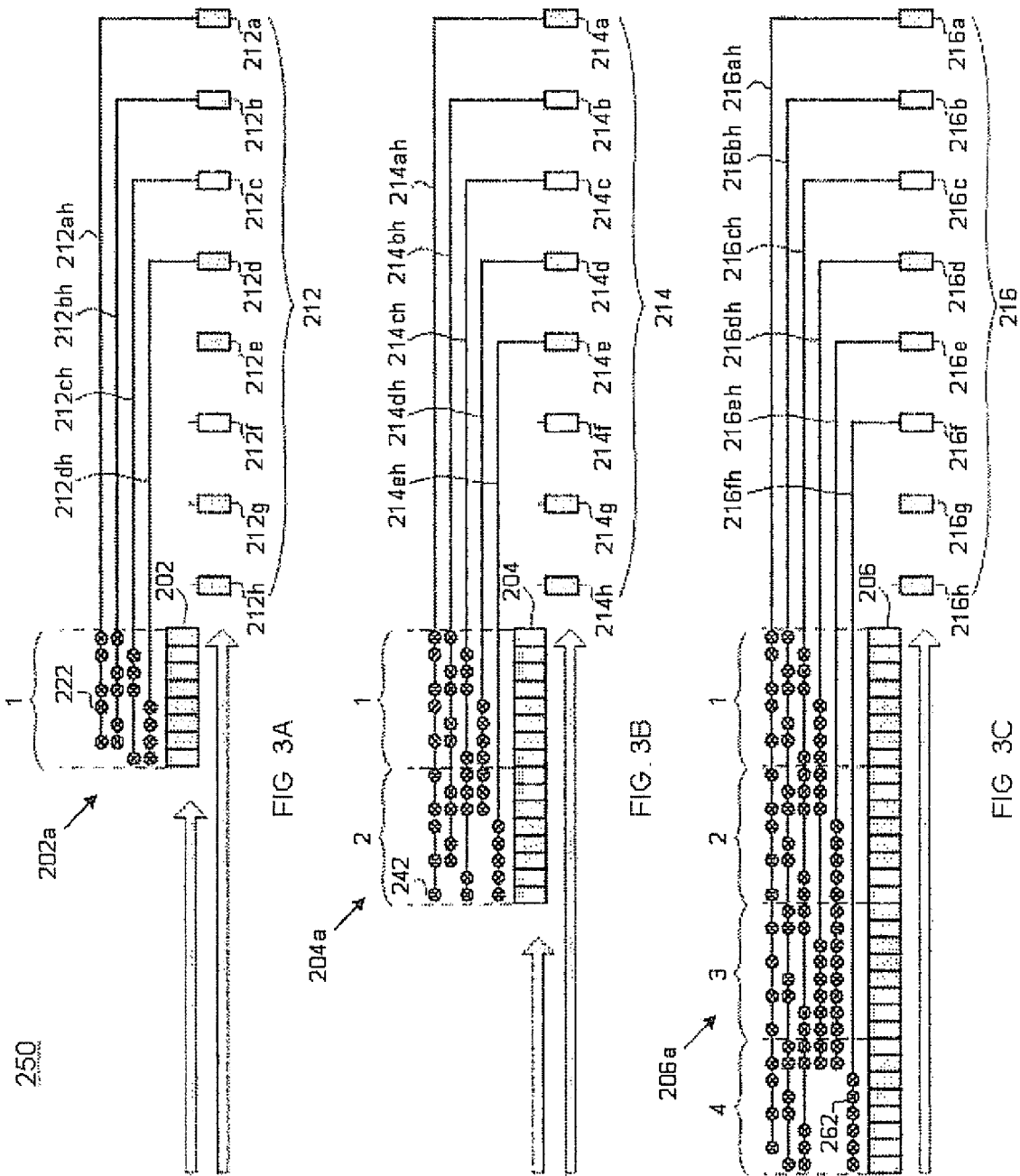

```
typedef struct protected_byte
{
    UINT8    byte_pr;
    UINT8    code_b_pr;
} PROT_BYTE;
```

FIG. 4A

```
typedef struct protected_word
{
    UINT16   word_pr;
    UINT8    code_w_pr;
} PROT_WORD;
```

FIG. 4B

```
typedef struct protected_long
{
    UINT32   long_pr;
    UINT8    code_l_pr;
} PROT_LONG;
```

FIG. 4C

SOFTWARE AND METHODS TO DETECT AND CORRECT DATA STRUCTURE

CROSS-REFERENCE TO RELATED APPLICATION

This patent application is a non-provisional of prior provisional patent application Ser. No. 60/816,206, filed on 23 Jun. 2006, the right of priority of which is hereby claimed for this patent application.

FIELD OF THE INVENTION

The present invention relates generally to software and methods to detect and correct bit errors in data. More particularly, the present invention relates to the use of such software and methods in intelligent electronic devices.

BACKGROUND OF THE INVENTION

Data are stored and retrieved from memory devices including volatile and non-volatile memories such as random access memory (RAM), FLASH memory, erasable programmable read only memory (EPROM), read only memory (ROM), magnetic and optical disks, or the like. Memories made of high-density integrated circuits are susceptible to transient single-bit errors caused by alpha particles, cosmic rays and similar radiation Alpha particles are found in lead solder and packaging materials. These events cause transient single-bit data errors, but do not cause permanent damage to the stored data. The transient single-bit data error corruptions are widely known as "Soft RAM Errors" if occurred in RAM memories. Soft RAM Errors, if uncorrected, can produce significant impacts to certain system operations. For instance, corrupted data bits can cause an intelligent electronic device (IED) such as a protection relay or another IED connected to the protection relay in an electric power grid to trip unnecessarily; disrupting manufacturing and causing productivity losses in affected areas.

Many previous inventions describe methods that add additional electronic circuits to the semiconductor memory to detect and correct errors in the data stored in the memory. A disadvantage with these inventions is that the additional circuits reduce the reliability, and increase the cost of the memory system. In addition, these inventions are usually inflexible since they are designed to correct one size of data only.

A known method to safeguard data accuracy is to use additional electronic hardware circuits to verify and correct data corruption in data streams during sending and receiving data. Such circuit functions include encoding, decoding, insertion of error codes into the data streams, detecting and correcting data errors using elaborate and complex algorithms that add delays. Some examples of such techniques and circuits are disclosed in U.S. Pat. Nos. 6,983,414 and 5,844,918, respectively. Using hardware circuits for data error correction techniques in data communication is well established, but the implementation is complex and costly. Also, these approaches are impossible to implement when the memory is integrated with the central processing unit (CPU) in the same electronic device. It is therefore desirable to have a method that checks and corrects data errors without added unreliability and without added hardware cost.

A general object of the present invention is, therefore, to therefore provide methods to detect and correct bit errors in data.

Another object of the present invention is to check and correct data errors in memory storage devices.

A further object of the present invention is to use known algorithms to perform error check and error corrections.

Yet another object of the present invention is to provide single-bit error-detection and correction to the data without altering the data format, thereby permitting un-encoded data to be accessed quickly and easily A still further object of the present invention is to provide firmware programming to implement the methods of the present invention, wherein the firmware may be embedded in a microcontroller or field programmable gate array (FPGA).

Another object of the present invention is to implement the methods of the present invention in an intelligent electronic device (IED).

SUMMARY OF THE INVENTION

The present invention relates to using a software method to detect and correct bit errors in data. In an embodiment, the software method comprising the steps of 1) specifying to a compiler a variable wherein the variable includes an error checking code, 2) calculating an error checking code value indicative of the variable; 3) storing the variable, 4) retrieving the variable upon demand; 5) performing an error check and error correction to the variable.

In an embodiment, the variable includes data of defined size with the error checking code appended to the data. In another embodiment, the error checking code includes data specific for performing error checking and error correction to the data.

Yet in another embodiment, the method utilizes a variety of algorithms to perform error check and error corrections on the data. Such algorithms may include a Hamming Code, a modified Hamming Code, a Bose-Chaudhuri-Hocquenghem (BCH) code and a CRC parity check.

In an embodiment, the method checks and corrects data errors in memory storage devices. Memory storage devices may include volatile and non-volatile memory devices such as RAM, FLASH, ROM, PROM, EPROM, magnetic and optical disks, or the like.

In another embodiment, the method checks and corrects data errors in digital communication data stream or in a computing platform where a data buffer is available to store the data. Yet in another embodiment, the method appends the error checking code with encoding information that allows single-bit error-detection and correction to the data without altering the data format; thus allowing the unencoded data to be accessed quickly and easily.

Yet in another embodiment, the method is implemented through firmware programming. In another embodiment, the firmware is embedded in a microcontroller or FPGA.

In an embodiment, the method is implemented in an IED having a data buffer. Some of the IEDs include memory storage devices, computing platforms, I/O processors, network devices, communication equipment, protection and control devices, or the like.

This invention implements detection and correction of errors in memory using a software approach. The invention can be applied to any computing architecture without affecting reliability or cost.

In a further embodiment, the present invention is directed to software or firmware (collectively referred to as "software") which may be stored on or in a computer readable medium. The computer readable medium thus contains instructions or code segments, that when executed by a data processor, perform steps relating to the methods of detecting and correcting bit errors in data in accordance with the present invention. The computer readable medium is used by a data processor to carry out the method steps of 1) specifying to a compiler a variable wherein the variable includes an error checking code; 2) calculating an error checking code value indicative of the variable; 3) storing the variable; 4) retrieving the variable upon demand, 5) performing an error check and error correction to the variable. Further code segments on the computer readable medium may be used by a data processor to carry out the steps of storing and retrieving the data structure directly onto the storage area without additional encoding and decoding circuitry, encoding and decoding the data structure without altering the data structure format during storing and retrieving from the storage area, detecting and correcting double bit errors, communicating the data structure through wired or wireless communication, or communicating the data structure through optical or magnetic devices.

BRIEF DESCRIPTION OF THE DRAWINGS

The invention, together with its objects and the advantages thereof, may best be understood by reference to the following description taken in conjunction with the accompanying drawings, in which like reference numerals identify like elements in the figures, and in which;

FIGS. 3A to 3C illustrate an embodiment of the present invention within a processor 250 in a microcontroller performing encoding functions to various data sizes by an error checking code.

FIGS. 4A to 4C illustrate one of the unused checking data bits in accordance with the present invention.

DESCRIPTION OF THE PREFERRED EMBODIMENTS

It will be understood that the present invention may be embodied in other specific forms without departing from the spirit thereof. The present examples and embodiments, therefore, are to be considered in all respects as illustrative and not restrictive, and the invention is not to be limited to the details presented herein.

Figure 1A:
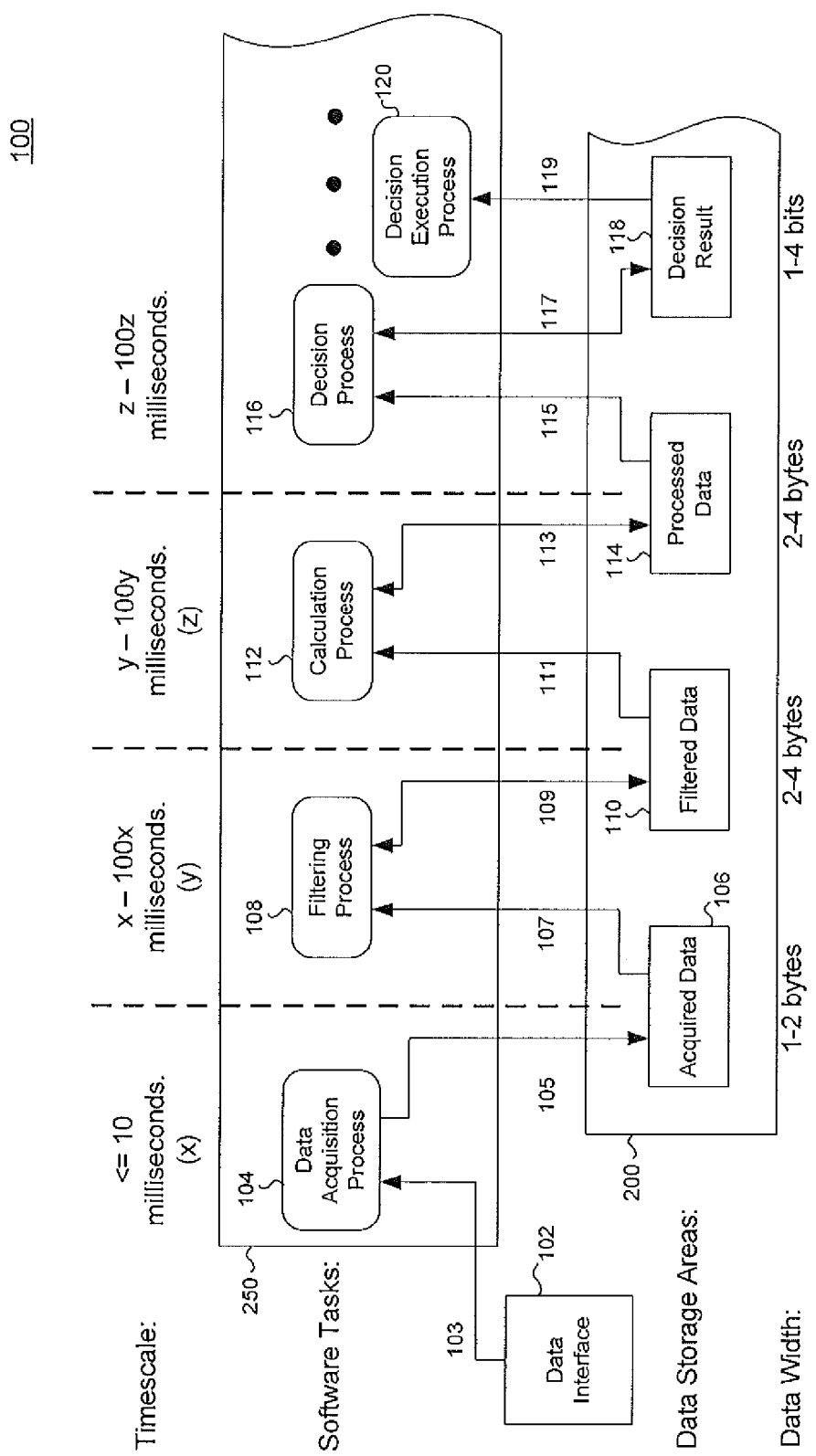
FIG. 1A illustrates a prior art data interface which performs software tasks in an IED.

Software tasks in an IED 100 perform a plurality of functions. With reference to FIG. 1A, most frequently a Data Acquisition Process 104 acquires data 103 from a Data Interface 102. The data 105 is stored in an allocated memory Acquired Data storage area 106. The data 105 stored is usually the same size as the data 103 acquired.

A Filtering Process 108 runs at a similar rater or slower than the Data Acquisition Process 104. The Filtering Process 108 retrieves new data 107 from the Acquired Data storage area 106, and old results data 109 from a Filtered Data storage area 110, and calculates a new data 109 that is stored in the Filtered Data storage area 110. The data stored in Filtered Data storage area 110 is often larger than the input data 109.

A Calculation Process 112 can run at a similar rate, or slower than the Filtering Process 108. A Calculation Process 112 retrieves one or more data 111 items from the Filtered Data storage area 110, and old results data 113 from a Processed Data area 114, and calculates a new result data 113 that is stored in the Processed Data storage area 114. The Calculation Process may be a null operation in some operations. The data stored 113 is usually of similar size to the input data 111.

A Decision Process 116 can run at a similar rate, or slower than the Calculation Process 112. The Decision Process 116 retrieves new data 115 from the Processed Data storage area 114, and compares the new data 115 with a preset value to produce data 117 that is stored in a Decision Result storage area 118. The data 117 stored is usually only a few bits in size.

As a result of the speed of response normally required, all of the storage areas 106, 110, 114 and 118 are located in a memory 200, such as a semiconductor memory. As noted elsewhere, data stored in memory 200 can be corrupted by alpha particles and similar radiation events. The probability of corruption is low, but nonzero. IEDs, such as protective relays, are normally activated for extended periods (often years in duration), so they are more likely to experience a data corruption that could cause a false decision result. Thus, one of the aspects of the present invention is directed to a method of safeguarding all the critical data in storage areas 106, 110, 114 and 118 to be retrieved as data 119 in a Decision Execution Process 120.

FIG. 1A also illustrates the relative time scale for each task performed. In an embodiment, the Filtering Process 108, the Calculation Process 112, the Decision Process 116 and the Decision Execution Process 120 are performed in a microcontroller.

Any bit errors in the data whether caused by radiation or noise jitter can be detected and corrected by software method by first specifying error checking codes when storing data 105, 109, 113 and 117 in the corresponding storage areas 106, 110, 114 and 118. The error checking code checks and corrects bit error in the data stream during data retrieval process The software bit error correction method will be further described in FIGS. 3 and 4.

Figure 1B:
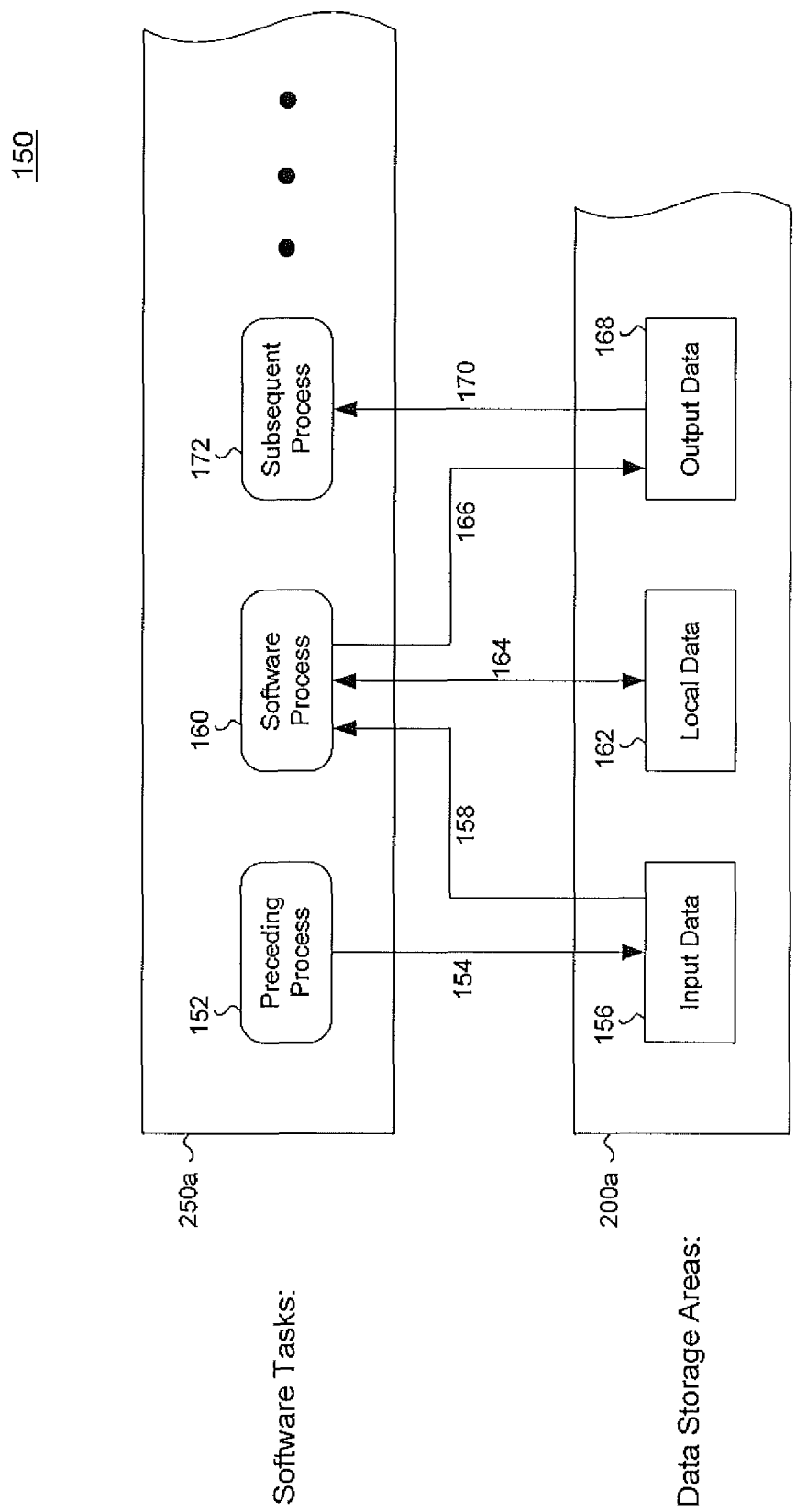
FIG. 1B illustrates another prior art data interface which performs software tasks in an IED.

FIG. 1B illustrates another prior art data interface performed by software tasks in an IED. In another embodiment, each software task such as from a preceding process 152, current software process 160 and subsequent process 172 runs from time-to-time, depending upon the application The software tasks 152, 160 and 172 may not be synchronized, so data 154, 158, 164, 166 and 170 each created by respective task may reside in a storage area 156, 162 and 168 for a long time before it is used by the next task.

The Software Process 160 reads new data 158 from the Input Data storage area 156. The Software Process 160 will also read data 164 from its Local Data storage area 162. Local Data 164 may have been created during previous iterations of the Software Process 160. The Software Process 160 creates new data 166 that is stored in an Output Data storage area 168. The Software Process 160 will also write new data 164 into the Local Data storage area 162 for use by subsequent process iterations of the Software Process 160

Figure 2A:
FIGS. 2A to 2C illustrate an embodiment of the present invention within a memory where data of different sizes can be specified in a software program.
Figure 2B:
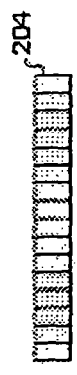
Figure 2C:
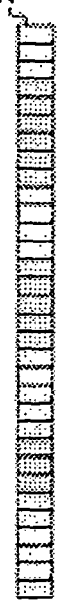

FIGS. 2A to 2C illustrate an embodiment of the present invention within a memory where data of different sizes can be specified in a software program. Normally, the data size would be specified to a compiler, such as in 'C' code, using instructions 220a, 240a and 260a similar to those shown on the left side of FIGS. 2A to 2C specifying unprotected raw data. For illustration, UINT8 in FIG. 2A would specify in the storage area 8 bits (1 byte) of raw data 202. UINT16 in FIG. 2B would specify in the storage area 16 bits (2 bytes) of raw data 204, and UINT32 in FIG. 2C would specify in the storage area 32 bits (4 bytes) of raw data 206. The names used are not important; all that matters is that the compiler understands that a particular name corresponds with only one size of data in the storage.

A method of specifying protected data in the storage areas, such as in memory 200 using instructions 220b, 240b and 260b, is illustrated at the right side of FIGS. 2A to 2C. Each of these instructions 220b, 240b and 260b specifies functions and respective data variables including raw data 202, 204 and 206 of corresponding data size, and an additional byte of storage for error checking codes 212, 214 and 216 forming respective protected data structures 202a, 204a and 206a. The order of the raw data 202 to 206 within the instructions 220b to 260b is not important.

The additional byte of storage, as error checking codes 212 to 216 in the instructions 220b to 260b, can contain a function that checks the contents of the raw data 202 to 206 in the storage area such as storage areas 106, 110, 114 and 118 shown in FIG. 1A; allowing error detection and correction when the respective data 107, 109, 111, 113, 115, 117 and 119 are retrieved from the memory 200. This checking method includes encoding and parity checks that are described below.

In order to store the protected data structure in memory 200, the programmer must create a function that accepts the respective raw data 202 to 206, creates the respective error checking codes 212 to 216 (encoding and parity checks) that are executed in the compiler through the respective instructions 220b to 260b; and then stores the protected data structures 202a to 206a into the allocated space in memory 200.

Similarly, to retrieve the respective raw data 202 to 206 from memory 200, a function must be specified within instructions 220b to 260b that reads the protected data structures 202a to 206a from the allocated spaces; checks the raw data 202 to 206 for errors (decoding and parity checks); corrects any errors; and then passes the respective raw data 202 to 206 to the calling function. Embedded within the error checking codes 212 to 216 are checking data that perform error detection and correction algorithms (encoding, decoding, parity checks). If there is no error, the stored raw data 202 to 206 and the retrieved raw data 202 to 206 from the memory 200 will be unchanged. Otherwise, any single-bit error in the retrieved raw data 202 to 206 will be corrected through the function of retrieval instruction.

There may be one or more functions to store protected data (depending upon the data size and the programmer's style) and one or more functions to retrieve protected data. Each of the specified functions is included within the instructions, for example using 'C' code to specify functions to the compiler in the processor 250.

For illustration purposes, to allocate storage for an 8-bit data variable that is unprotected, write:

```
[0070]
    [0070]UINT8
        variable_name;
[0070]
```

Alternatively, if the programmer wishes to allocate storage for an 8-bit data variable that is protected, he/she would write:

```
[0070]
    [0070]PROT_BYTE
        variable_name;
[0070]
```

To allocate storage for a 16-bit data variable that is unprotected, write:

```
[0070]
    [0070]  UINT16
        variable_name;
[0070]
```

Alternatively, if the programmer wishes to allocate storage for a 16-bit data variable that is protected, he/she would write.

```
[0070]
    [0070]PROT_WORD
        variable_name;
[0070]
```

In an embodiment, an example below illustrates using these functions to store and retrieve protected data structures 202a to 206a:

```
[0070]
    [0070]VOID
        put_protected_byte(PROT_BYTE*,
    UINT8);
    [0070]VOID
        put_protected_word(PROT_WORD*,
    UINT16);
    [0070]VOID
        put_protected_long(PROT_LONG*,
    UINT32*);
[0070]
[0070]   and functions to retrieve
protected data structures 202a to 206a:
[0070]
    [0070]RESULT
        get_protected_byte(PROT_BYTE*,
    UINT8*);
    [0070]RESULT
        get_protected_word(PROT_WORD*,
    UINT16*);
    [0070]RESULT
        get_protected_long(PROT_LONG*,
    UINT32*);
[0070]
```

These store and retrieve protected data functions can use any error detection and correction algorithm or scheme desired. In an embodiment, a modified Hamming Code is a common algorithm to detect and correct single-bit errors. The only requirements are that sufficient storage is allocated for the error checking code with checking data, and that the same algorithm is used for storing and retrieving a specific data size. Different data sizes can have different encoding schemes, error detection and correction schemes.

FIGS. 3A to 3C illustrate an embodiment of the invention within a porcessor 250 in a micro-controller performing encoding functions to various data sizes by the error checking code.

```
[0070]
2    encoded byte (Hamming Code algorithm)
3    encoded byte (Hamming Code algorithm)
4    encoded byte (Hamming Code algorithm)
5    encoded byte (Hamming Code algorithm)
[0070]
```

In an embodiment, the error checking codes 212 to 216 include respective checking data bits 212a to 212h, 214a to 214h and 216a to 216h, Each of the checking data bits 212a to 212d, 214a to 214e and 216a to 216f in the respective error checking codes 212, 214 and 216 is a parity bit for a group of bits in the raw data 202, 204 and 206. For example, checking data bit 212a in FIG. 3A is a parity bit to a group of five bits (bit 0,1,3,4,6) forming an encoding sequence 212ah in the raw data 202. Similarly, checking data bit 212b is a parity bit to a group of five bits (bit 0, 2,3,5,6) forming an encoding sequence 212bh; checking data bit 212c is a parity bit to a group of four bits (bit 1,2,3,7) forming an encoding sequence 212ch; and checking data bit 212d is a parity bit to a group of four bits (bit 4,5,6,7) forming an encoding sequence 212dh, and so forth. The encoding sequences 212ah to 212dh with the raw data 202 constitute a protected data structure 202a with an encoded byte 1. The encoding sequences 212ah to 212dh within the error checking code 212 correspond to the type of algorithm selected by the programmer. In this embodiment, the algorithm selected for illustration is a modified Hamming Code.

Similarly, for a 16 bit raw data 204, five checking data bits 214a to 214e within the error checking code 214 correspond to five encoding sequences 214ah to 214eh with the raw data 204 constituting a protected data structure of 204a with encoded bytes 1 and 2.

Similarly, for a 32 bit raw data 206, six checking data bits 216a to 216f within the error checking code 216 correspond to six encoding sequences 216ah to 216fh constituting a protected data structure 206a of encoded bytes 1 to 4.

Each applicable checking data bit 212a to 212d, 214a to 214e and 216a to 216f is set to a value that gives even parity when combined with the corresponding bits in the raw data 202, 204 and 206.

It is not important that the sequence of the encoding checking data bits 212a to 212d in the error checking code 212 be consecutive. The programmer can specify any sequence of checking data bits 212a to 212h within the error checking code 212 to perform the data encoding function in the protected data structures 202a to 206a.

FIGS. 4A to 4C illustrate an embodiment of the invention within a processor 250 in a microcontroller performing an optional parity check for the complete data structure.

FIGS. 4A to 4C also illustrate that one of the unused checking data bits such as 212e, 214f and 216g can be used to perform respective parity checks 212eh to 216eh for the complete data structures 202a to 206a, The parity check functions 212eh to 216eh check the overall parity including the prior checking data bits 212a to 212d, 214a to 214e and 216a to 216f in the data structures 202a, 204a and 206a The optional parity checks 212eh to 216eh provide detection of double bit errors through instructions from software or firmware codes. As shown, the encoding function in the instructions 220b, 240b and 260b is a modified Hamming Code designed such that the corruption of any single-bit error will be detected, and the location of the corrupt bit in the protected data 202a, 204a and 206a is indicated by the pattern of check bits 212e, 214h and 216g; where an even parity sum check for each raw data bit 202, 204 and 206 and the check bits 212e, 214h and 216g are expected.

Any remaining unused checking data bits (212f to 212h, 214g and 214h, 216h) in the error checking codes 212, 214 and 216 are set to zero.

In an embodiment of the invention to store the protected data in memory 200, a compiler instruction can be specified to include a function that accepts the raw data; creates the checking data and adds it into the data structure; and then stores the completed protected data structure into the allocated space in memory 200.

Similarly, to retrieve the protected data structure from memory, the programmer must specify in the compiler instruction to include a function that reads the data structure from the allocated space from memory 200; checks the data structure for errors; corrects any errors, and then passes the raw data to the calling code.

There may be one or more functions to store protected data structure (depending upon the data size and a style) and one or more functions to retrieve protected data structure.

One example uses the following functions to store and retrieve protected data structure.

The function put_protected_byte stores one byte of raw data into a PROT_BYTE data structure in memory. It is called with two parameters, the address of the PROT_BYTE data structure, and the value of the raw data.

```
1  VOID put_protected_byte (PROT_BYTE *data_ptr, UINT8
    raw_data)
2  {
       i.  PROT_BYTE temp_data;
       ii. UINT16   parity_data;
       iii. UINT8   checking_data;
       iv. /* Put the raw data into a temporary data structure */
       v.  temp_data.byte_pr = raw_data;
       vi. /* Initialize the checking data to zeroes */
       vii. temp_data.code_b_pr = 0;
       viii. /* Calculate the hamming code */
       ix. checking_data   = hamming_check_byte (&temp_data);
       x.  /* Add checking data to the temporary data structure */
       xi. temp_data.code_b_pr = checking_data;
       xii. /* Adjust double error check bit, as required */
       xiii. parity_data = temp_data.byte_pr ^ temp_data.code_b_pr;
       xiv. if (calc_parity(parity_data) != 0)
                1. temp_data.code_b_pr ^= 0x10;
       xv. /* Then store the temporary data structure into memory */
       xvi. *data_ptr = temp_data;
3  }
```

The function get_protected_byte retrieves one byte of raw data from a PROT_BYTE data structure in memory. It is called with two parameters, the address of the PROT_BYTE data structure, and the address of the raw data. The function returns a value of SUCCESS or FAILURE.

```
1  RESULT get_protected_byte(PROT_BYTE *byte_ptr,
    UINT8 *data_ptr)
2  {
       i.   PROT_BYTE  temp_data;
       ii.  UINT16   parity_data;
       iii. RESULT   return_value;
       iv.  UINT8    decode_result;
       v.   /* get the data structure from memory */
       vi.  temp_data   = *byte_ptr;
       vii. /* Check the data structure for errors */
       viii. decode_result  = hamming_check_byte(&temp_data);
       ix.  if (decode_result != 0)
       x.   {
                1. /* Soft error occurred, so report it */
                2. diag_flag_set(DIAG_SOFT_RAM);
                3. /* Correct any single errors in the raw data */
                4. temp_data.byte_pr         ^=
                   Bit_Mask_Data[decode_result];
                5. /* Correct any single errors in the checking data */
                6. temp_data.code_b_pr       ^=
                   Bit_Mask_Code[decode_result];
       xi.  }
       xii. /* Update the raw data in the calling function */
       xiii. *data_ptr = temp_data.byte_pr;
       xiv. /* Check the data structure for multiple errors */
       xv.  parity_data = temp_data.byte_pr ^ temp_data.code_b_pr;
       xvi. if (calc_parity(parity_data)  == 0)
```

```
     xvii. {
              1. /* No errors, so retrieval was successful */
              2. return_value  =  SUCCESS;
    xviii. }
     xix. else
      xx. {
              1. /* Multiple errors detected, so failed retrieval */
              2. return_value  =  FAILURE;
     xxi. }
    xxii. return return_value;
  3 }
```

The function put_protected_word stores one word of raw data into a PROT_WORD data structure in memory. It is called with two parameters, the address of the PROT_WORD data structure, and the value of the raw data.

```
1 VOID  put_protected_word  (PROT_WORD  *data_ptr,
    UINT16 raw_data)
2 {
      i. PROT_WORD temp_data;
     ii. UINT16    parity_data;
    iii. UINT8     checking_data;
     iv. /* Put the raw data into a temporary data structure */
      v. temp_data.word_pr  =  raw_data;
     vi. /* Initialize the checking data to zeroes */
    vii. temp_data.code_w_pr =  0;
   viii. /* Calculate the hamming code */
     ix. checking_data   = hamming_check_word (&temp_data);
      x. /* Add checking data to the temporary data structure */
     xi. temp_data.code_w_pr = checking_data;
    xii. /* Adjust double error check bit, as required */
   xiii. parity_data = temp_data.word_pr ^ temp_data.code_w_pr;
    xiv. if (calc_parity(parity_data) != 0)
              1. temp_data.code_w_pr ^= 0x20;
     xv. /* Then store the temporary data structure into memory */
    xvi. *data_ptr = temp_data;
 3 }
```

The function get_protected_word retrieves one word of raw data from a PROT_WORD data structure in memory. It is called with two parameters, the address of the PROT_WORD data structure, and the address of the raw data. The function returns a value of SUCCESS or FAILURE.

```
1 RESULT get_protected_word(PROT_WORD *word_ptr,
    UINT16 *data_ptr)
2 {
      i. PROT_WORD temp_data;
     ii. UINT16    parity_data;
    iii. RESULT    return_value;
     iv. UINT8     decode_result;
      v. /* get the data structure from memory */
     vi. temp_data   = *word_ptr;
    vii. /* Check the data structure for errors */
   viii. decode_result  =  hamming_check_word(&temp_data);
     ix. if (decode_result != 0)
      x. {
              1. /* Soft error occurred, so report it */
              2. diag_flag_set(DIAG_SOFT_RAM);
              3. /* Correct any single errors in the raw data */
              4. if (decode_result <= 12)
              5. {
/* Correct single bit error in least significant byte of raw data */
   temp_data.word_pr ^=
     3 (UINT16)Bit_Mask_Data[decode_result];
              1. }
              2. else if (decode_result <= 21)
              3. {
/* Correct single bit error in most significant byte of raw data */
              a. temp_data.word_pr ^=
                 b. ((UINT16)Bit_Mask_Data[decode_result] << 8);
              4. }
              5. if (decode_result <= 21)
              6. {
                 a. /* Correct any single errors in the checking data */
                 b. temp_data.code_w_pr ^=
                 c. Bit_Mask_Code[decode_result];
              7. }
     ii. }
    iii. /* Update the raw data in the calling function */
     iv. *data_ptr  =  temp_data.word_pr;
      v. /* Check the data structure for multiple errors */
     vi. parity_data = temp_data.word_pr ^ temp_data.code_w_pr;
    vii. if (calc_parity(parity_data)  == 0)
   viii. {
              1. /* No errors, so retrieval was successful */
              2. return_value  =  SUCCESS;
     ix. }
      x. else
     xi. {
              1. /* Multiple errors detected, so failed retrieval */
              2. return_value  =  FAILURE;
    xii. }
   xiii. return return_value;
 4 }
```

The function put_protected_long stores one long word of raw data into a PROT_LONG data structure in memory. It is called with two parameters, the address of the PROT_LONG data structure, and the value of the raw data.

```
1 VOID put_protected_long (PROT_LONG *data_ptr, UINT32
   raw_data)
2 {
      i. PROT_LONG temp_data;
     ii. UINT16 parity_data;
    iii. UINT8 checking_data;
     iv. /* Put the raw data into a temporary data structure */
      v. temp_data.long_pr   =  raw_data;
     vi. /* Initialize the checking data to zeroes */
    vii. temp_data.code_l_pr =  0;
   viii. /* Calculate the hamming code */
     ix. checking_data   = hamming_check_long (&temp_data);
      x. /* Add checking data to the temporary data structure */
     xi. temp_data.code_l_pr = checking_data;
    xii. /* Adjust double error check bit, as required */
   xiii. parity_data = (UINT16) temp_data.long_pr
              1. ^ (UINT16)(temp_data.long_pr >> 16)
              2. ^ temp_data.code_l_pr;
    xiv. if (calc_parity(parity_data) != 0)
              1. temp_data.code_l_pr ^= 0x40;
     xv. /* Then store the temporary data structure into memory */
    xvi. *data_ptr = temp_data;
 3 }
```

The function get_protected_long retrieves one long word of raw data from a PROT_LONG data structure in memory. It is called with two parameters, the address of the PROT_LONG data structure, and the address of the raw data. The function returns a value of SUCCESS or FAILURE.

```
1 RESULT get_protected_long(PROT_LONG *long_ptr,
   UINT32 *data_ptr)
2 {
      i. PROT_LONG temp_data;
     ii. UINT16    parity_data;
    iii. RESULT    return_value;
     iv. UINT8     decode_result;
      v. /* get the data structure from memory */
     vi. temp_data  =  *long_ptr;
```

```
    vii. /* Check the data structure for errors */
   viii. decode_result = hamming_check_byte(&temp_data);
     ix. if (decode_result != 0)
      x. {
         1. /* Soft error occurred, so report it */
         2. diag_flag_set(DIAG_SOFT_RAM);
         3. /* Correct any single errors in the raw data */
         4. if (decode_result <= 12)
         5. {
/* Correct single bit error in least significant byte of raw data */
   temp_data.long_pr ^=
   3 (UINT32)Bit_Mask_Data[decode_result];
            1. }
            2. else if (decode_result <= 21)
            3. {
/* Correct single bit error in next significant byte of raw data */
               a. temp_data.long_pr ^=
               b. ((UINT32)Bit_Mask_Data[decode_result] << 8);
            4. }
            5. else if (decode_result <= 29)
            6. {
/* Correct single bit error in next significant byte of raw data */
               a. temp_data.long_pr ^=
               b. ((UINT32)Bit_Mask_Data[decode_result] << 16);
            7. }
            8. else if (decode_result <= 37)
            9. {
/* Correct single bit error in most significant byte of raw data */
               a. temp_data.long_pr ^=
               b. ((UINT32)Bit_Mask_Data[decode_result] << 24);
           10. }
           11. if (decode_result <= 37)
           12. {
               a. /* Correct any single errors in the checking
                  data */
               b. temp_data.code_w_pr ^=
               c. Bit_Mask_code[decode_result];
                  13.)
     ii. }
    iii. /* Update the raw data in the calling function */
     iv. *data_ptr = temp_data.long_pr;
      v. /* Check the data structure for multiple errors */
     vi. parity_data = (UINT16) temp_data.long_pr
         1. ^ (UINT16)(temp_data.long_pr >> 16)
         2. ^ temp_data.code_I_pr;
    vii. if (calc_parity(parity_data) == 0)
   viii. {
         1. /* No errors, so retrieval was successful */
         2. return_value = SUCCESS;
     ix. }
      x. else
     xi. {
         1. /* Multiple errors detected, so failed retrieval */
         2. return_value = FAILURE;
    xii. }
   xiii. return return_value;
4 }
```

In an embodiment, the correction of single bit errors may use two look-up tables. One look-up table for errors in the raw data, and another look-up table for errors in the checking data. The two look-up tables are:

```
const static UINT8 Bit_Mask_Data[39] =
{
0x00,                    /* This is the no error case */
0x00,                    /* Check bit 0 */
0x00,                    /* Check bit 1 */
0x01,                    /* Data bit 0 */
0x00,                    /* Check bit 2 */
0x02, 0x04, 0x08,        /* Data bits 1-3 */
0x00,                    /* Check bit 3 */
                         1. /* Data bits 4 - 10 */
0x10, 0x20, 0x40, 0x80, 0x01, 0x02, 0x04,
0x00,                    /* Check bit 4 */
                         2. /* Data bits 11 - 18 */
0x08, 0x10, 0x20, 0x40, 0x80, 0x01, 0x02, 0x04,
                         3. /* Data bits 19 - 25 */
0x08, 0x10, 0x20, 0x40, 0x80, 0x01, 0x02,
0x00,                    /* Check bit 5 */
                         4. /* Data bits 26 - 31 */
0x04, 0x08, 0x10, 0x20, 0x40, 0x80
};
const static UINT8 Bit_Mask_Code[39] =
{
0x00,                    /* This is the no error case */
0x01,                    /* Check bit 0 */
0x02,                    /* Check bit 1 */
0x00,                    /* Data bit 0 */
0x04,                    /* Check bit 2 */
0x00, 0x00, 0x00,        /* Data bits 1-3 */
0x08,                    /* Check bit 3 */
                         5. /* Data bits 4 - 10 */
0x00, 0x00, 0x00, 0x00, 0x00, 0x00, 0x00,
0x10,                    /* Check bit 4 */
                         6. /* Data bits 11 - 18 */
0x00, 0x00, 0x00, 0x00, 0x00, 0x00, 0x00, 0x00,
                         7. /* Data bits 19 - 25 */
0x00, 0x00, 0x00, 0x00, 0x00, 0x00, 0x00,
0x20,                    /* Check bit 5 */
                         8. /* Data bits 26 - 31 */
0x00, 0x00, 0x00, 0x00, 0x00, 0x00,
};
```

Figure 5:
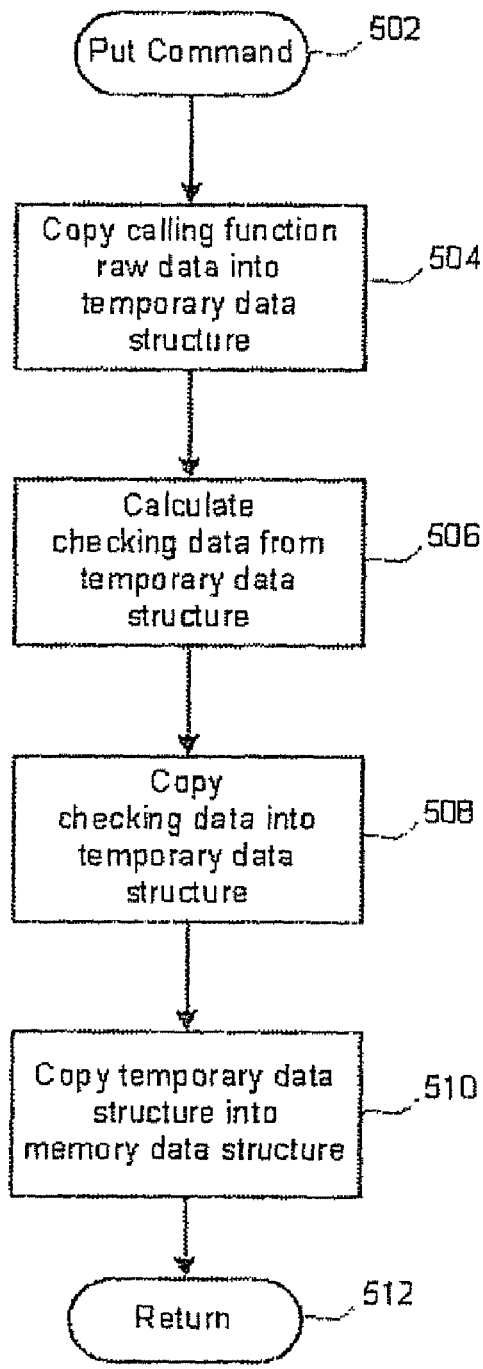
FIG. 5 illustrates an embodiment of specifying a function to store data in accordance with the present invention.

FIG. 5 illustrates an embodiment of specifying a function to store data. In the diagram of FIG. 5, the method is initiated at bubble 502 by a put command. At block 504, calling function raw data is copied into a temporary data structure. A function is performed at block 506 to calculate checking data from the temporary data structure. The checking data is then copied into the temporary data structure at block 508. At block 510, the temporary data structure is copied into a memory data structure. The method then returns at bubble 512 to await the next put command.

Figure 6:
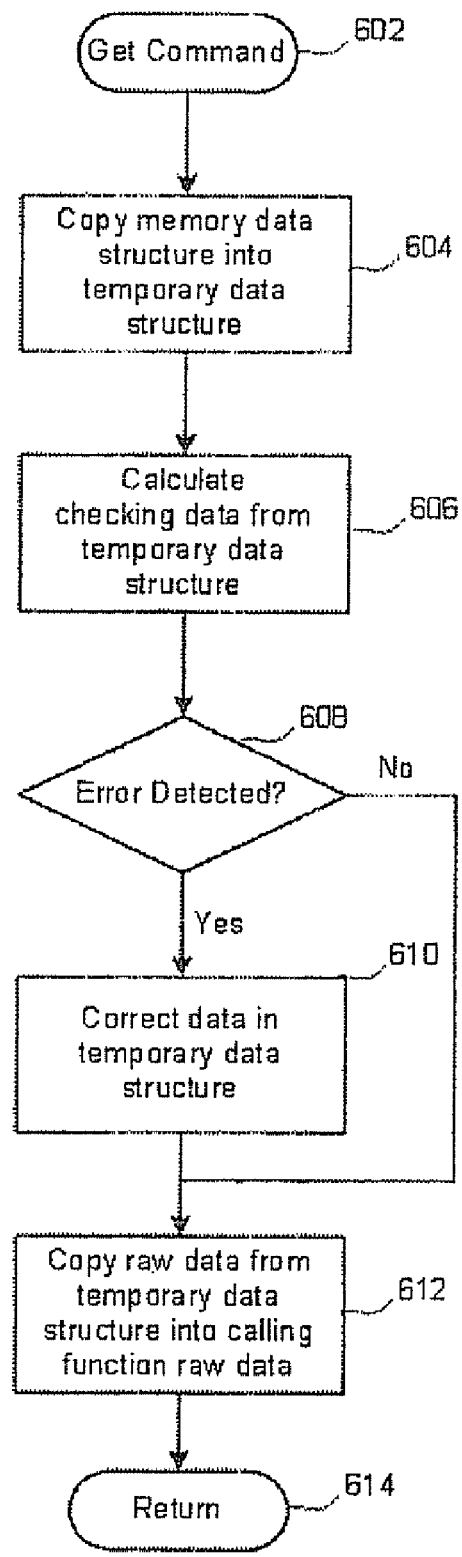
FIG. 6 illustrates an embodiment of specifying a function to receive data in accordance with the present invention.

FIG. 6 illustrates an embodiment of specifying a function to receive data. In the diagram of FIG. 6, the method is initiated at bubble 602 by a get command. At block 604, the memory data structure, such as that provided at block 510 in FIG. 5, is copied into a temporary data structure. A function is performed at block 606 to calculate checking data from the temporary data structure. Decision block 608 then determines if there is any error in the temporary data structure. If so, data in the temporary data structure is corrected at block 610. If not, or if the data was corrected at block 610, the method proceeds to block 612 where the raw data from the temporary data structure is copied into calling function raw data. The method then returns at bubble 614 to await the next get command.

In view of the foregoing discussion of methods in accordance with the present invention, it will be appreciated that the present invention also encompasses software or firmware (collectively referred to as "software") for performing the methods. For example, the software may be stored on or in a computer readable medium, such as on a compact disk (CD), volatile and non-volatile memories such as random access memory (RAM), FLASH memory, erasable programmable read only memory (EPROM), read only memory (ROM), magnetic and optical disks, or the like. The computer readable medium contains instructions or code segments, that when executed by a data processor, perform steps relating to the methods of detecting and correcting bit errors in data in accordance with the present invention. In one embodiment, the computer readable medium is used by a data processor to carry out the method steps of 1) specifying to a compiler a variable wherein the variable includes an error checking code, 2) calculating an error checking code value indicative of the variable; 3) storing the variable, 4) retrieving the variable upon demand; 5) performing an error check and error correction to the variable. In accordance with other embodiments, further code segments on the computer readable medium may be used by a data processor to carry out the steps of storing and retrieving the data structure directly onto the storage area without additional encoding and decoding circuitry, encoding and decoding the data structure without altering the data structure format during storing and retrieving from the storage area, detecting and correcting double bit errors, communicating the data structure through wired or wireless communication, or communicating the data structure through optical or magnetic devices.

In an embodiment, this method of appending an error checking code to the data uses software functions to perform encoding, single-bit error detection using parity checks and error correction, and maintains the format of the data and allows the un-encoded data to be accessed quickly and easily. Yet in another embodiment, the method utilizes a variety of known algorithms to perform error check and error corrections on the data, including Hamming Codes, Bose-Chaudhuri-Hocquenghem (BCH), CRC parity checks or modifications of encoding and decoding algorithms.

In an embodiment, the method checks and corrects data errors in memory storage devices. The memory storage devices include volatile and non-volatile memory devices such as RAM, FLASH, ROM, PROM, EPROM, magnetic and optical disks, or the like.

In another embodiment not shown, the method can apply the same principle to check and correct data errors in a digital communication data stream or in a computing platform where a data buffer is available to store the data.

Yet in another embodiment, the method may be implemented through firmware programming. In another embodiment, the firmware may be embedded in a microcontroller or FPGA.

In an embodiment, the method may be implemented in an IED having a data buffer. Some of the IEDs include memory storage devices, computing platforms, I/O processors, network devices, storage networks, communication equipment, protection and control devices, or the like. The present invention can be applied to any computing architecture without affecting reliability or cost.

While particular embodiments of the invention have been shown and described, it will be obvious to those skilled in the art that changes and modifications may be made therein without departing from the invention in its broader aspects.

The invention claimed is:

1. A method to detect and correct bit errors in a data structure with software of firmware instructions comprising the steps of:
    specifying to a compiler a storage area for a protected variable wherein the protected variable includes a data value corresponding to a data size of an associated unprotected variable, and an error checking code;
    calculating an error checking code value for the unprotected variable, in an intelligent electronic device;
    storing the unprotected variable with the error checking code value;
    retrieving the unprotected variable with the error checking code value upon demand;
    detecting an error on the unprotected variable using the error checking code value;
    correcting the error upon detection of an error on the unprotected variable; and,
    encoding and decoding the data structure without altering the data structure format during storing and retrieving from the storage area.

2. The method of claim 1, wherein the software or firmware instructions store and retrieve the data structure directly onto the storage area without additional encoding and decoding circuitry.

3. The method of claim 1, wherein the storage area includes volatile and non-volatile memories.

4. The method of claim 3, wherein the volatile and non-volatile memories include high density semiconductor integrated circuit memory arrays.

5. The method of claim 3, wherein the non-volatile memories include magnetic and optical storage media.

6. The method of claim 1, wherein the firmware instructions are embedded in a microcontroller.

7. The method of claim 1, wherein the firmware instructions are embedded in a field programmable gate array.

8. The method of claim 1, wherein the error checking code comprises checking data bits to encode and parity check the data value at each data position.

9. The method of claim 8, wherein the error checking code further comprises a checking data bit to parity check the entire data structure.

10. The method of claim 1, wherein the error checking code comprises checking data bits to parity check the data value at each data position.

11. The method of claim 10, further comprising the step of: detecting and correcting any double bit errors.

12. The method of claim 11, wherein the algorithm is selected from a group of methods consisting of a Hamming Code, a modified Hamming Code, a Bose-Chaudhuri-Hocquenghem, a CRC parity checks, and combinations thereof.

13. The method of claim 1, wherein the error checking code follows an algorithm to detect and correct for a single-bit error.

14. The method of claim 1, wherein the data structure is part of a digital communication data stream.

15. The method of claim 1, wherein the storage area is a data buffer or main memory storage device within an intelligent electronic device.

16. The method of claim 15, wherein the intelligent electronic device comprises one selected from a group consisting of: a computing platform, and I/O processor, a network device, a storage network, a communication equipment, an optical device, and a protection, automation, metering, measurement or control device.

17. The method of claim 1, wherein a storage area is part of a storage network.

18. The method of claim 1, further comprising the step of: communicating the data structure through wired or wireless communication.

19. The method of claim 1, further comprising the step of: communicating the data structure through optical or magnetic devices.

20. The method of claim 1, wherein the data value is from raw data.

21. A computer readable medium containing instructions that when executed by a data processor performs steps, comprising the steps of:
    specifying to a compiler a storage area for a protected variable wherein the protected variable includes a data value corresponding to a data size of an associated unprotected variable, and an error checking code;

calculating an error checking code value for the unprotected variable;

storing the unprotected variable with the error checking code value;

retrieving the unprotected variable with the error checking code value upon demand;

detecting an error on the unprotected variable using the error checking code value;

correcting the error upon detection of an error on the unprotected variable; and, encoding and decoding the data structure without altering the data structure format during storing and retrieving from the storage area.

22. The computer readable medium of claim 21, further comprising the step of:

storing and retrieving the data structure directly onto the storage area without additional encoding and decoding circuitry.

23. The computer readable medium of claim 21, further comprising the step of:

detecting and correcting any double bit errors.

24. The computer readable medium of claim 21, further comprising the step of:

communicating the data structure through wired or wireless communication.

25. The computer readable medium of claim 21, further comprising the step of:

communicating the data structure through optical or magnetic devices.

* * * * *